(12) United States Patent
Ardakani et al.

(10) Patent No.: US 9,594,477 B1
(45) Date of Patent: Mar. 14, 2017

(54) USING DEEP LINKS TO RESTORE INTERACTIVE STATE OF A WEB PAGE

(71) Applicant: SYMANTEC CORPORATION, Mountain View, CA (US)

(72) Inventors: Parinaz R. Ardakani, San Jose, CA (US); David M. Close, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 336 days.

(21) Appl. No.: 14/174,502

(22) Filed: Feb. 6, 2014

(51) Int. Cl.
*G06F 3/0484* (2013.01)

(52) U.S. Cl.
CPC ................................. *G06F 3/0484* (2013.01)

(58) Field of Classification Search
None
See application file for complete search history.

(56) References Cited

U.S. PATENT DOCUMENTS

| | | | | |
|---|---|---|---|---|
| 2002/0103902 | A1* | 8/2002 | Nagel | G06F 17/30861 709/225 |
| 2006/0069666 | A1* | 3/2006 | Burke | G06Q 10/063 |
| 2007/0255810 | A1* | 11/2007 | Shuster | G06F 17/30864 709/219 |
| 2008/0109619 | A1* | 5/2008 | Nakanishi | G06F 11/1469 711/159 |
| 2014/0059420 | A1* | 2/2014 | Cole | G06F 17/30882 715/234 |
| 2014/0201350 | A1* | 7/2014 | Lakes | H04L 67/02 709/223 |

OTHER PUBLICATIONS

No Author, "Deep Linking," Support Center Wix.com, [retrieved Apr. 10, 2015], 3 pages, Internet: <https://www.wix.com/support/html5/editor/pages/kb/deep-linking>.

(Continued)

*Primary Examiner* — Tuan Dao
(74) *Attorney, Agent, or Firm* — Wilmer Cutler Pickering Hale and Dorr LLP

(57) ABSTRACT

A method and apparatus for interactive state restoring are described. A browser loads a web page using a uniform resource locator (URL). The web page includes interactive elements. The web page is in a default state when loaded by the browser in a first instance and is in an interactive state when any one of the interactive elements is changed. An interactive state restoring tool executing in connection with the browser monitors URLs being loaded by the browser and identifies a data object appended to an end of a first URL for the web page with interactive elements. The interactive state restoring tool extracts the data object from the URL and restores the web page in the interactive state using the data object extracted from the URL when the web page is loaded by the browser. The interactive state restoring tool can execute a state-restoring JavaScript method for consumption of an enhanced deep link. The interactive state restoring tool can also execute a state-capturing JavaScript method to capture the current state, append a JSON object to the URL and add this URL to the history as an enhanced deep link.

21 Claims, 5 Drawing Sheets

(56) References Cited

OTHER PUBLICATIONS

No Author, "Mavention Deep Links," Mavention Products, [retrieved Apr. 9, 2015], 3 pages, Internet: <http://www.mavention.com/products/deep-links>.

No Author, American FactFinder Deep Linking Guide, U.S. Census Bureau, Dec. 4, 2014, [retrieved Apr. 9, 2015], 42 pages, Internet: <http://factfinder2.census.gov/files/AFF_deep_linking_guide.pdf>.

No Author, "Backing Up and Restoring Bookmarks," Firefox—MozillaZine Knowledge Base, [retrieved Apr. 9, 2015], 3 pages, Internet: <http://kb.mozillazine.org/Backing_up_and_restoring_bookmarks_-_Firefox>.

No Author, "I Saved Bookmarks in JSON File to Export—Now How to Convert to HTML to Import?" Mozilla Support, Apr. 13, 2011, [retrieved Apr. 10, 2015], 3 pages, Internet: <http://support.mozilla.org/en-US/questions/810651>.

No Author, "Sterilize Chrome JSON Bookmarks," Stack Overflow, Oct. 29, 2012, [retrieved Apr. 9, 2015], 4 pages, Internet: <http://stackoverflow.com/questions/13130492/sterilize-chrome-json-bookmarks>.

No Author, "URL Format in a JSON Query String," Stack Overflow, May 16, 2013, [retrieved Apr. 10, 2015], 2 pages, Internet: <http://stackoverflow.com/questions/16595230/url-format-in-a-json-query-string>.

No Author, "Using JSON (Bing, Version 2)," Microsoft, [retrieved Apr. 10, 2015], 2 pages, Internet: <http://msdn.microsoft.com/en-us/library/dd250846.aspx>.

Douglas Crockford, "JSONRequest," JSON.org, Apr. 17, 2006 (updated Aug. 10, 2012), [retrieved Apr. 10, 2015], 9 pages, Internet: http://www.json.org/JSONRequest.html>.

\* cited by examiner

USING DEEP LINKS TO RESTORE INTERACTIVE STATE OF A WEB PAGE

TECHNICAL FIELD

Embodiments of the present invention relate generally to interactive web pages, and in particular, using deep links to restore interactive state of a web page.

BACKGROUND

A web page is a web document that is suitable for the World Wide Web and the web browser. A web browser displays a web page on a monitor or mobile device. The web page is what displays, but the term also refers to a computer file, usually written in HTML or comparable markup language, whose main distinction is to provide hypertext that will navigate to other web pages via links. Web browsers coordinate web resources centered around the written web page, such as style sheets, scripts and images, to present the web page.

On a network, a web browser can retrieve a web page from a remote web server. On a higher level, the web server may restrict access to only a private network such as a corporate intranet or it provide access to the World Wide Web. On a lower level, the web browser uses the Hypertext Transfer Protocol (HTTP) to make such requests.

A static web page is delivered exactly as stored, as web content in the web server's file system, while a dynamic web page is generated by a web application that is driven by server-side software or client-side scripting. Dynamic web pages help the browser (the client) to enhance the web page through user input to the server.

JavaScript (JS) is a computer programming language. As part of web browsers, implementations allow client-side scripts to interact with the user, control the browser, communicate asynchronously, and alter the document content that is displayed. It has also become common in server-side programming, game development and the creation of desktop applications.

SUMMARY

In one implementation, a method includes monitoring, by an interactive state restoring tool executing in connection with a browser executing by a processor, uniform resource locators (URLs) being loaded by the browser. The interactive state restoring tool identifies a data object appended to an end of a first URL for a web page comprising a plurality of interactive elements. The web page is in a default state when loaded by the browser in a first instance and the web page is in an interactive state when any one of the plurality of interactive elements is changed. The method further extracts, by the interactive state restoring tool, the data object from the URL and restores the web page in the interactive state using the data object extracted from the URL when the web page is loaded by the browser.

In a further embodiment, the method loads the web page in the default state when the first URL does not include the data object and loads the web page in the interactive state when the first URL includes the data object. The data object specifies one or more parameters of the plurality of interactive elements representing the interactive state of the plurality of interactive elements.

In a further embodiment, the plurality of interactive elements comprises a filter. The method further comprising applying a parameter of the filter to the web page when being loaded by the browser.

In a further embodiment, the first URL is loaded by the browser as at least one of a static page-to-page link or an email link in a message.

In a further embodiment, the first URL is loaded by the browser in a navigation history of the browser. In this embodiment, the method loads the web page, by the browser using a default URL representing when the web page is in the default state in the first instance. The method further includes intercepting, byte interactive state restoring tool executing in the browser, a command to close the web page. In response to the command, the interactive state restoring tool captures the interactive state of the web page, creates the data object comprising attribute-value pairs to represent the interactive state, and determines whether a size of the data object precludes the data object from being appended to the URL in view of a character limit of URLs. When the size of the data object precludes the data object from being appended, the interactive state restoring tool consolidates the data object to a consolidated format. The method further includes appending the data object to the URL to create a modified URL corresponding to the web page in the interactive state, and adding the modified URL to the navigation history of the browser. The modified URL is the first URL loaded by the browser.

In some embodiments, the interactive state restoring tool includes a state-capturing JavaScript method and a state-restoring JavaScript method.

In some embodiments, the interactive state restoring tool is implemented in JavaScript. In other embodiments, the capturing the interactive state comprises: inspecting a current state of each of the plurality of interactive elements; recording data values representing the current state of any one or more of the plurality of interactive elements that have changed from the default state; and creating a JavaScript Objection Notation (JSON) object as the data object with the recorded current states, and wherein the consolidating comprises identifying the data values in common and combining the data values in common in the consolidated format when the size of the data object precludes the data object from being appended.

In some embodiments, the capturing the interactive state comprises: inspecting a current state of each of the plurality of interactive elements; identifying one or more of the plurality of interactive elements whose current state has changed, and wherein the consolidating comprises: identifying two or more of the plurality of interactive elements that have common attributes or common values for consolidation; and consolidating the current states of the two or more of the plurality of interactive elements into a consolidated state; and creating a JavaScript Objection Notation (JSON) object as the data object with at least data values representing the consolidated state. The JSON object has a defined data structure.

In some embodiments, the appending the data object to the URL comprises: creating a string with the data values representing the consolidated state from the JSON object; and adding the string to an end of the URL to create the modified URL.

In some embodiment, a first interactive element of the plurality of interactive elements is a filter with parameters specified by a user. The capturing the interactive state further comprises: inspecting the filter to identify the parameters to capture the current state of the filter; recording data values representing the identified parameters as the current state; and creating JavaScript Objection Notation (JSON) object as the data object with at least the data values representing the identified parameters of the filter.

In other embodiments, the capturing the interactive state further comprises: inspecting a current state of each of the plurality of interactive elements; recording data values representing the current state of any one or more of the plurality of interactive elements that have changed from the default state, wherein the consolidating comprises: determining common data points in current states of two or more of the plurality of interactive elements; and creating an array to represent the of current states of the two or more of the plurality of interactive elements to consolidate the current states; and creating JavaScript Objection Notation (JSON) object as the data object with at least the array.

In some embodiment, the appending comprises: creating a string with data values representing the current states from the JSON object; and adding the string to an end of the URL.

In addition, a non-transitory computer readable storage medium for interactive state restoring is described. The non-transitory computer readable storage medium includes instructions that, when executed by a processor, cause the processor perform the operations described above. In addition, an apparatus comprising a memory device and a processor coupled to the memory device is described. The processor is to execute an interactive state restoring tool in connection with a browser. The interactive state tool and the browser are to perform the operations described above.

BRIEF DESCRIPTION OF THE DRAWINGS

In order to understand the invention and to see how it may be carried out in practice, embodiments will now be described, by way of non-limiting examples only, with reference to the accompanying drawings, in which.

DETAILED DESCRIPTION

A method and apparatus for interactive state restoring are described. A browser loads a web page using a uniform resource locator (URL). The web page includes interactive elements. The web page is in a default state when loaded by the browser in a first instance and is in an interactive state when any one of the interactive elements is changed. An interactive state restoring tool executing in connection with the browser monitors URLs being loaded by the browser and identifies a data object appended to an end of a first URL for the web page with interactive elements. The interactive state restoring tool extracts the data object from the URL and restores the web page in the interactive state using the data object extracted from the URL when the web page is loaded by the browser. The interactive state restoring tool can execute a state-restoring JavaScript method for consumption of an enhanced deep link. The interactive state restoring tool can also execute a state-capturing JavaScript method to capture the current state, append a JSON object to the URL and add this URL to the history as an enhanced deep link. A web page can be restored to reflect a last state of interaction of the web page using the modified URL. These modified URLs can works for both internal website links and external links sent in email messages.

Figure 1:
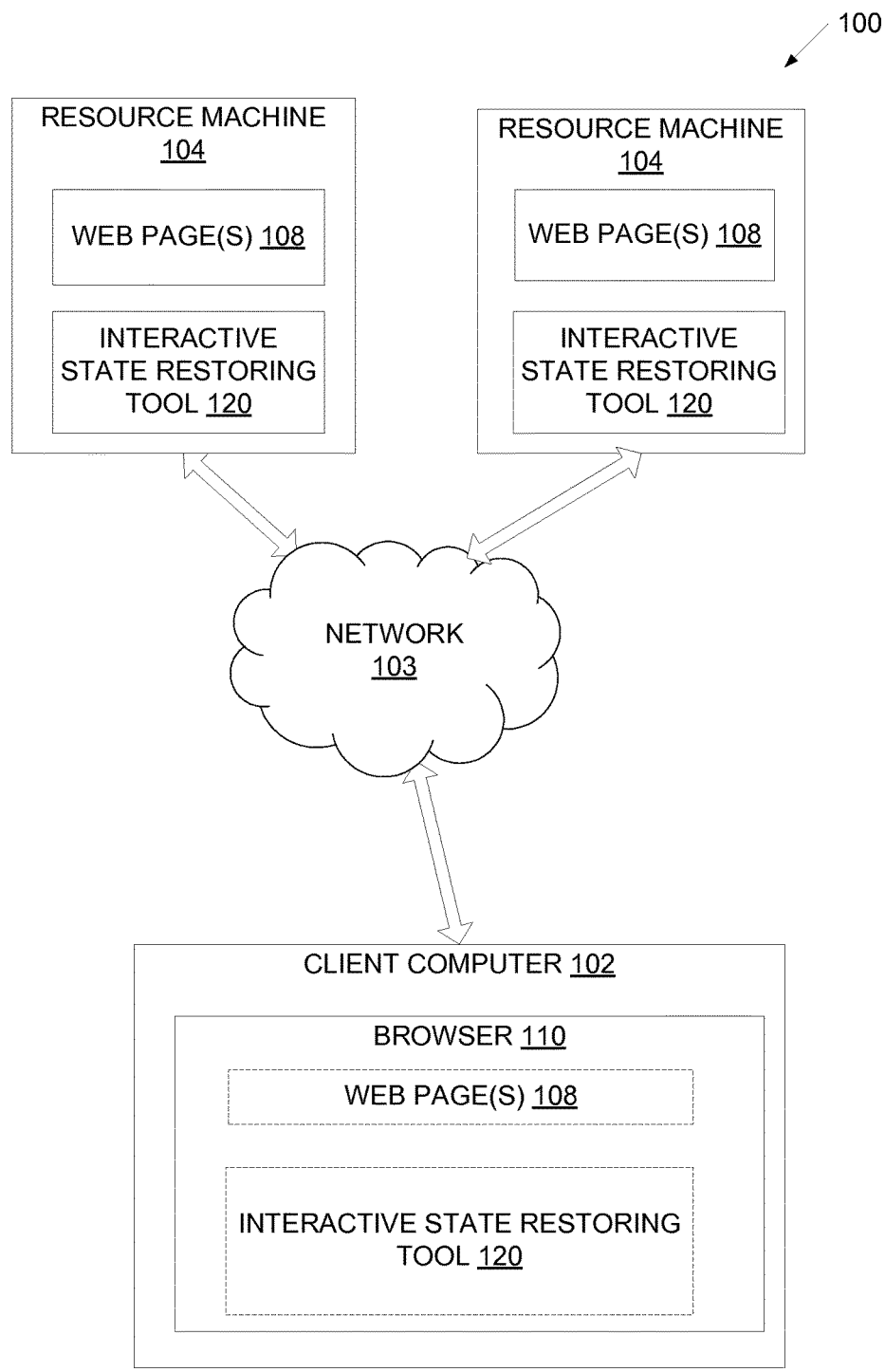
FIG. 1 is a block diagram of an exemplary network architecture in which embodiments of an interactive state restoring tool may operate.

FIG. 1 is a block diagram of an exemplary network architecture in which embodiments of an interactive state restoring tool may operate. The network architecture 100 may include one or more resource machines 104, a client computing system (hereinafter client, client device or user device) 102, each capable of communicating with one another via a network 103. Network 103 may include, for example, a private network such as a local area network (LAN), a wide area network (WAN), a global area network (GAN) such as the Internet, or a combination of such networks, and may include a wired or wireless network. The data governance system can be part of a cloud computing system. The client computing system 102 may be a personal computer, a tablet computer, a mobile phone such as a smart phone, a personal digital assistant (PDA), a portable media player, a netbook or the like. There can be any number of client computing systems 102 in network architecture 100. Users may access the resources in the resource machine 104 using client computing systems 102. Resource machines 104 may be one or more machines including one or more server computers, gateways or other similar computing devices connected to the client computing systems 102 via the network 103. There can be any number of resource machines or servers in network architecture 100. The resource machine 104 can provide Internet resources, such as web pages 108 to client computing system 102 via the network 103. For example, a client computing system 102 can send a request for a web page 108 using a browser 110. The browser 110 (or other type of application that requests web pages) can be used to access various resource of the resource machine 104, including the web page(s) 108 and interactive state restoring tool 108. The browser 110 can be used to request the web pages 108 using URLs. The resource machine 104 serves the web page 108 to the browser 110. The web page 108 includes interactive elements. The interactive elements can be implemented as interactive features of the web page. For example, some web sites deliver client-side scripts with the web page 108, the client-side scripts being capable of making additional HTTP request to a server, either in response to user actions or based on lapsed time, or the like. The server's responses are used to modify the current page rather than creating a new page with each response so the server needs only to provide limited, incremental information. The interactive elements of the web page 108 may include text fields, radio buttons, filter(s), or other parameters specified in the web page 108. The web page 108 is in a default state when loaded by the browser 110 in a first instance and the web page 108 is in an interactive state when any one of the interactive elements is changed (i.e., has a different state than the default state). The resource machine 104 also provides the interactive state restoring tool 108 to the browser 110. The resource machine 104 may be implemented in JavaScript. JavaScript is a computer programming language. As part of web browsers, implementations allow client-side scripts to interact with the user, control the browser, communicate asynchronously, and alter the document content that is displayed. The interactive state restoring tool 108 can be delivered with the web page 108 to the browser 108. The JavaScript for the interactive state restoring tool 108 can execute to perform various operations described herein for capturing an interactive state of the web page 108 and restoring the web page 108 to the captured interactive state when reloaded by the browser 110 or another browser on another machine.

The interactive state restoring tool 108 can be used to restore a web page 108 to a specific state. It should be noted that the web page 108 doesn't necessarily need to be a public web page that are external links that can be accessed on the Internet, but may also be internal links (or any type of network page) to network pages within an internal network. For example, while a user is working on a project in the Certificate intelligence Center (CIC) platform, developed by Symantec of Mountain View Calif., there are instances where the user may wish to restore a page to a specific state. When navigating to a previous page, the user wants to restore a last-seen interactive state of that page. Without the interactive state restoring tool 108, when a URL of the page is reloaded, the web page is reloaded in the default state because the interactive state is not captured. However, with the interactive state restoring tool 108, the interactive state of the page can be captured and added to the URL as a modified URL. The modified URL can be used to return to the web page with the last-seen interactive state of the web page.

In another case, when sending an email to another user with a recommended next action, the user could capture the interactive state of the web page and send the modified URL to restore the interactive state of the web page in order to expedite the other user's next action. The interactive state restoring tool 108 is a front-end only solution that can use only JavaScript to restore a page to reflect a prior state of interaction. As described herein, the interactive state restoring tool 108 works for both internal website links and external links sent in email messages.

In one embodiment, before a user leaves a page, the interactive state restoring tool 108 obtains the state of all interactive elements and creates a JavaScript Object Notation (JSON) with this information. The interactive state restoring tool 108 appends to the URL a stringified version of this JSON. To stringify is to convert a value to JSON, optionally replacing values if a replacer function is specified, or optionally including only the specified properties if a replacer array is specified. The replacer function is if a function, transforms values and properties encountered while stringifying. If an array, the replacer function specifies the set of properties included in objects in the final string. The modified URL can be added to the navigation history of the browser. The modified URL can also be sent in an email in order to restore the web page to the interactive state.

In a further embodiment, after loading any web page 108, the interactive state restoring tool 108 checks for the presence of this state information in the URL. If found, the string is converted back into a JSON object which the interactive state restoring tool 108 uses to restore state for each interactive element referenced therein. The interactive state restoring tool 108 can use the string appended to the URL to restore the page to any state other than the default state. Using the embodiments described herein a website would be able to load a page from navigation history and restore the interactive state of the page.

In another embodiment, the interactive state restoring tool 108 can be client-side logic that is implemented in the browser 110, in a browser plug-in or the like. However, it should be noted that interactive pages already may use JavaScript for one or more interactive elements of the web page. Thus, implementing the interactive state restoring tool 108 in JavaScript would not need special types of browsers or browser plug-ins in order to restore the interactive state of the web page. As described herein, the interactive state restoring tool 108 is entirely a front-end solution because the state is captured by JavaScript, stored as JSON object appended to URL and the state is restored by JavaScript. Additional details of the interactive state restoring tool 108 are described below with respect to FIG. 2.

The interactive state restoring tool 108 using enhanced deep links to restore the interactive state of a web page. A basic deep link is any URL, which links to a page other than the home page, e.g., test.com/reports/recent.html or test.com/search. The enhanced deep links, created by the interactive state restoring tool 108 includes additional information useful for restoring the interactive state of the page. The format of this additional information may be a JSON object appended to the basic deep link as a hash string. For example, the interactive elements on the web page at test.com/search could be appended as a string to the URL, as follows:
test.com/search#/{"filters":[{"category":"gender","values": ["men","women"]},{"category":"pro motion","values": ["clearance"]}]}category":"promotion","values":["clearance"]}]}

This modified URL can be saved in the navigation history or recorded elsewhere, such as in an email or the like. When the page is loaded, there is JavaScript code in the interactive state restoring tool 108 that reads this modified URL and determines whether it is an enhanced link. If so, the JavaScript code then parses the information and restores the interactive state as specified. In this particular example, the interactive web page could include a product search with filters for gender and promotions, among others. Upon loading this particular link, the filters are automatically selected for men's and women's clearance items and the search is initiated. All this happens at load time so that the user is presented with actual search results rather than a search page in its default state. An example use case is a promotional email with a link back to the website which directly presents a user with the clearance search results.

Some solutions are entirely back-end in that they reload the page with each filter action. Other solutions have both a front-end solution as user interacts with page and a back-end solution for restoring state. Some of the embodiments describe herein are entirely front-end, eliminating the inefficiency of duplicated efforts of a dual front-end and back-end solution and increasing flexibility over the purely back-end solution.

It should be noted that embodiments using JavaScript to capture and restore state may be different for different applications. The JavaScript can capture the state by looking at each interactive element and storing the current state as a value. This could be 'checked' for a checkbox, any 'string value' for an input field, a date for a calendar date picker, etc. The state of custom interactive elements could be similarly captured accordingly. It should also be noted that assembling a JSON object with all of this data may be specific to each application. The JSON object can be defined ahead of time because the JavaScript used to extract the values expects a certain data structure which should be assembled by the JavaScript for capturing. One example is as follows:

{"filters":[{"category":"gender","values":["men", "women"]},{"category":"promotion","values": ["clearance"]}],"selected":["1747734","1747727", "1832663"]}

Below, the same JSON string is expanded for easy reading:

```
{
    "filters": [
        {
            "category": "gender",
            "values": [
                "men",
                "women"
            ]
        },
        {
            "category": "promotion",
            "values": [
                "clearance"
            ]
        }
    ],
    "selected": [
        "1747734",
        "1747727",
        "1832663"
    ]
}
```

In this example, there are some filter options which should be restored and also the identifiers (IDs) of specific items in the search results which should be selected or checked, however the user interface (UI) interaction may be specified in the particular application.

Figure 2:
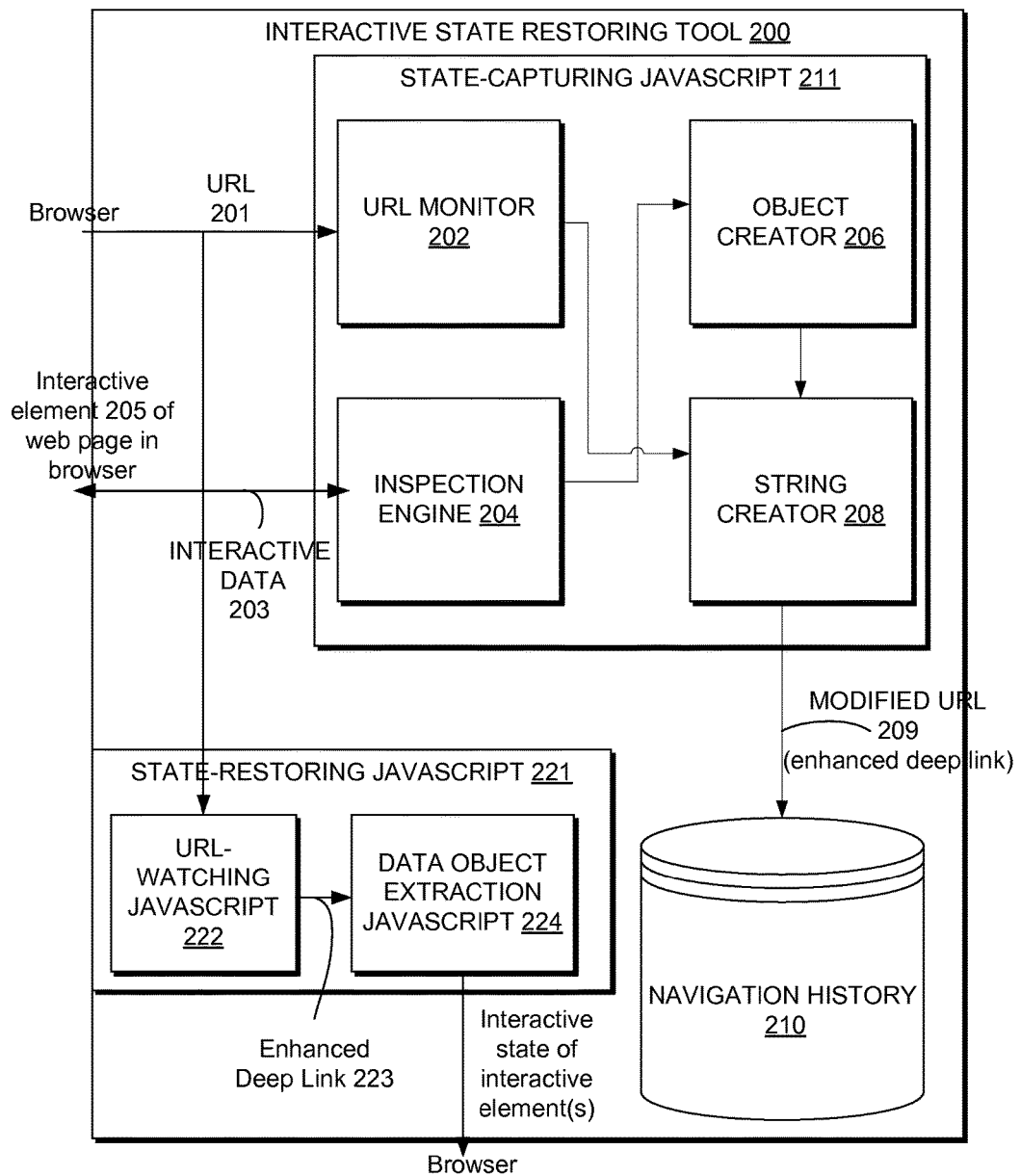
FIG. 2 is a block diagram of an interactive state restoring tool for interactive state restoring according to one embodiment.

FIG. 2 is a block diagram of an interactive state restoring tool 200 for interactive state restoring according to one embodiment. The interactive state restoring tool 200 can be used for capturing an interactive state of a web page and restoring the interactive state of the web page. The interactive state restoring tool 200 can be executed by a processor. The interactive state restoring tool 200 can use a URL monitor 202 to obtain a URL 201 of a web page loaded by a browser. The interactive state restoring tool 200 can use an inspection engine 204 to inspect each interactive element 205. The inspection engine 204 determines a current state of the interactive element 205 from interactive data 203. The interactive state restoring tool 200 uses an object creator 206 to create a data object with the current states of the interactive elements 205 of the web page. The interactive state restoring tool 200 uses a string creator 208 to create a string of the data object created by the object creator 206. As described herein the data object can be a JSON object and may be consolidated when the data object would exceed a maximum character limit of URLs. The string creator 208 can receive the URL 201 from the URL monitor 202 and appends the string to an end of the URL 201 to create a modified URL 209 and stores the modified URL 209 in a navigation history 210 of the browser, instead of the URL 201. The modified URL 209 represents an interactive state of the web page, as opposed to the URL 201, which represents a default state of the web page.

It should be noted that there are various embodiments described herein of the interactive state restoring tool 200. In one embodiment, the interactive state restoring tool 200 includes a state-capturing JavaScript method 211 and a state-restoring JavaScript method 221. The state-capturing JavaScript method 211 can capture the current state of a web page before a user leaves a web page. The state-capturing JavaScript method 211 can create and append a JSON data object to the URL. The state-capturing JavaScript method 211 can add this URL with the appended JSON object to the history of the browser. This is the creation of an enhanced deep link. In one embodiment, the state-capturing JavaScript method 211 includes components 202, 204, 206, and 208, as described above. In other embodiments, other components or other JavaScript methods may be used.

The state-restoring JavaScript method 221 can be used for the consumption of an enhanced deep link. That is the state-restoring JavaScript method 221 can be used for the restoration of an interactive state of the web page upon loading a web page. The state-restoring JavaScript method can include URL-watching JavaScript method 222 that looks at the URL 201 to determine if there is an enhanced deep link 223. If not, the browser just loads the web page as normal. Otherwise, the URL-watching JavaScript method 222 parses the deep link 223 and passes it into a data object extraction JavaScript method 224 that can then iterate over the various key/value pairs in the data object (e.g., JSON object) and restore the state of each interactive element described therein.

In another embodiment, the interactive state restoring tool 200 uses just the state-restoring JavaScript method 221. For example, there are cases where static page-to-page links or links in messages, such as email messages or instant messages can be used. In these cases, there may not use the state-capturing JavaScript method 211 to capture the interactive state, but the browser, using the interactive state restoring tool 200 can consume an URL with the data object to restore an interactive state of a web page. In some cases, a pre-defined link which takes a user to a particular page and restores the intended state for a given purpose may be used. For example, an administrator can send an email with the predefined enhanced deep link to a user that restores a web page to an interactive state, for example, for a next action by the user. For example, a promotional email with a link back to the website which directly presents a user with the clearance search results can be achieved using the enhanced deep links that are created on another machine.

In another embodiment, the interactive state restoring tool 200 uses just the state-capturing JavaScript method 211 for an enhanced browser history of enhanced deep links. In this case, the state-capturing JavaScript method 211 can capture an interactive state of the web page before leaving one page and store it in the history 210 so that the interactive state can be restored if the user returns to the original page.

In one embodiment, the interactive state restoring tool 200 is primarily for the consumption of enhanced deep links to restore an interactive state of a web page. In another embodiment, the interactive state restoring tool 200 can be used for construction of enhanced deep links to capture interactive state, which can be handled dynamically by the state-capturing JavaScript method 211, but other times the enhanced deep links are created manually and thus they are used statically.

Figure 3A:
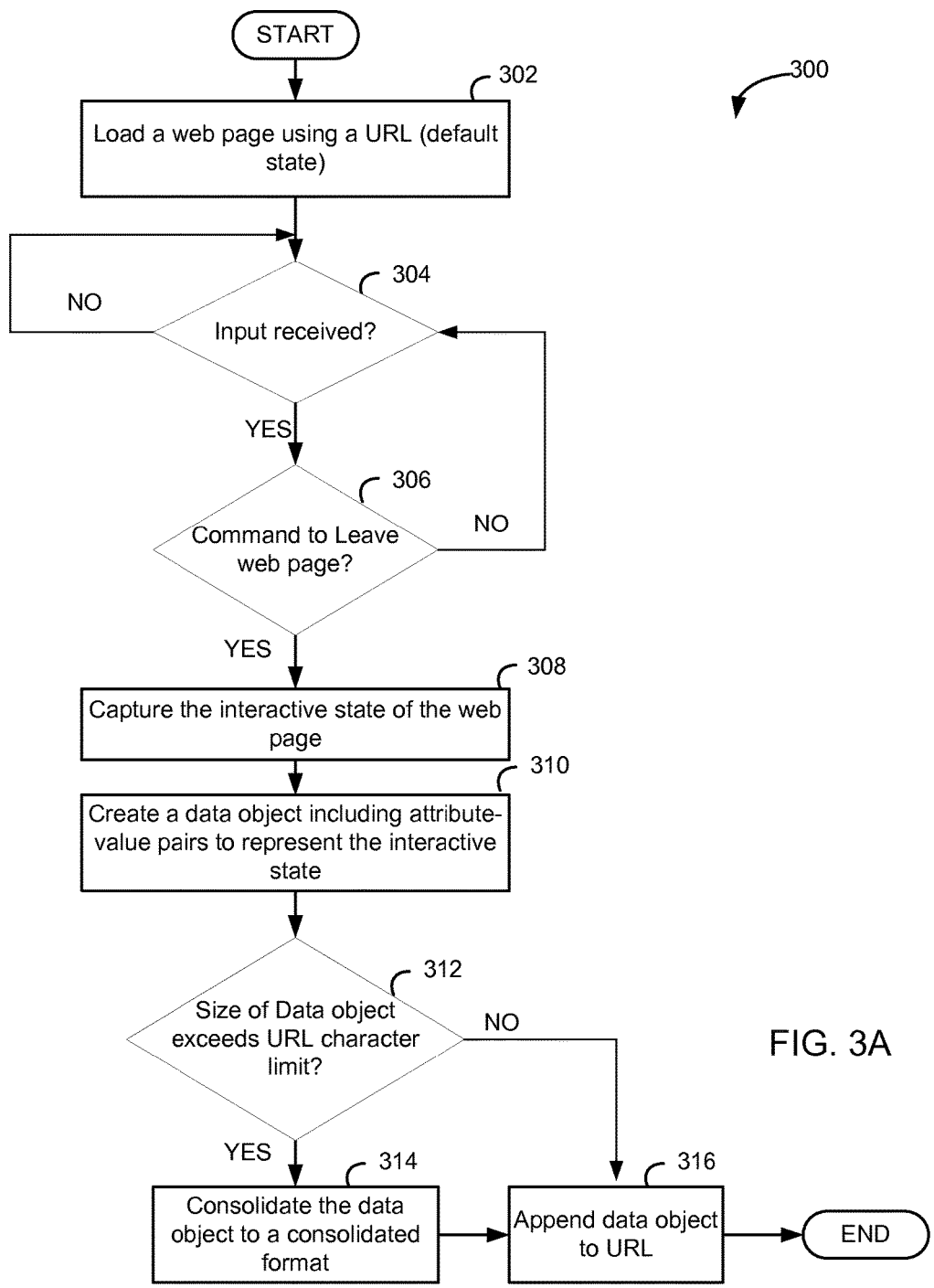
FIG. 3A is a flow diagram of one embodiment of a method of interactive state restoring.

FIG. 3A is a flow diagram of one embodiment of a method 300 of interactive state restoring. The method 300 is performed by processing logic that may comprise hardware (circuitry, dedicated logic, etc.), software (such as is run on a general-purpose computing system or a dedicated machine), or a combination of both. In one embodiment, the interactive state restoring tool 120 of FIG. 1 performs the method 300. In another embodiment, the interactive state restoring tool 200 of FIG. 2 performs the method 300. Alternatively, other components of the client computing system 102 or resource machine 104 can be configured to perform some or all of the method 300.

Referring to FIG. 3A, method 300 begins by the processing logic with loading a web page using a URL (block 302). The web page includes interactive elements and is in a default state when loaded by the browser in a first instance. The web page is in an interactive state when any one of the interactive elements is changed. The processing logic determines whether an input to change one of the one or more interactive elements is received (block 304). When changes have been made to the interactive element(s), the processing logic determines whether a command to indicate that a user is leaving the web page is received (block 306). That is, the processing logic intercepts the command to determine when to capture an interactive state of the web page. When no command has been received, the processing logic returns to block 304. For example, the browser can receive a close page event, a close tab event, or even a back to previous page command. In response to the command, the processing logic captures the interactive state of the web page, such as recording various parameters of the interactive elements (block 308). The processing logic creates a data object including attribute-value pairs to represent the interactive state (block 310). The processing logic determines whether a size of the data object precludes the data object from being appended to the URL in view of a character limit of URLs (block 312). When the of the data object precludes the data object from being appended to the URL, the processing logic consolidates the data object to a consolidated format (block 314) and appends the consolidated data object to the URL (block 316), and the method 300 ends. When the size of the data object does not preclude the data object from being appended to the URL, the processing logic appends the data object to the URL at block 316; and the method 300 ends.

In a further embodiment, the processing logic adds the modified URL to a navigation history of the browser. In another embodiment, the processing logic can add the modified URL to an email message in response to a user's action to send the current state of the web page to another user, for example.

In some embodiments, the character limit of URLs is 255 characters. If the modified URL would exceed this character limit, the string being added to an end of the original URL can be truncated using a specified data structure. For example, the string can be a hash that represents the current states in a more compact or more concise manner. In some cases, the JSON object is stringified and appended to the URL. In other cases, the processing logic can organize the current states according to the specified data structure. The specified data structure can reduce an amount of data to be appended to the URL in order to capture the interactive state of the web page, as well as to restore the interactive state when restored. For example, if there are three data points in common, instead of storing the three data points, a data structure can be used to record the three data points in a condensed form.

In a further embodiment, the processing logic is implemented as JavaScript. The JavaScript can be delivered to the browser in connection with the web page. In another embodiment, the client-side logic of the JavaScript can be implemented in the browser, a plugin to the browser, or the like.

In another embodiment, the processing logic captures the interactive state at block 308 by inspecting a current state of each of the interactive elements, recording data values representing the current state of any one or more of the interactive elements that have changed from the default state, and creating a JSON object as the data object with the recorded current states. The processing logic can consolidate the data object at block 314 by identifying the data values in common and combining the data values in common in the consolidated format when the size of the data object precludes the data object from being appended.

In another embodiment, the processing logic captures the interactive state at block 308 by inspecting a current state of each of the interactive elements, identifying one or more of the interactive elements whose current state has changed. At block 314, the processing logic consolidates the data object by identifying two or more of the interactive elements that have common attributes or common values for consolidation. The processing logic consolidates the current states of the two or more of the interactive elements into a consolidated state and creates a JSON object as the data object with at least data values representing the consolidated state. The JSON object may include a defined data structure.

In a further embodiment, the processing logic appends the data object to the URL at block 316 by creating a string with the data values representing the consolidated state from the JSON object and adding the string to an end of the URL to create the modified URL.

In a further embodiment, a first interactive element is a filter with parameters specified by a user. The processing logic at block 308 inspects the filter to identify the parameters to capture the current state of the filter. The processing logic records data values representing the identified parameters as the current state and creates the JSON object as the data object with at least the data values representing the identified parameters of the filter.

In a further embodiment, the processing logic captures the interactive state at lock 308 by inspecting a current state of each of the interactive elements, and recording data values representing the current state of any one or more of the interactive elements that have changed from the default state. The processing logic consolidates the data object at block 314 by determining common data points in current states of two or more of the interactive elements and creating an array to represent the of current states of the two or more of the interactive elements to consolidate the current states. The processing logic creates the JSON object as the data object with at least the array.

In a further embodiment, the processing logic appends the data object at block 316 by creating a string with data values representing the current states from the JSON object and adds the strings to an end of the URL.

Figure 3B:
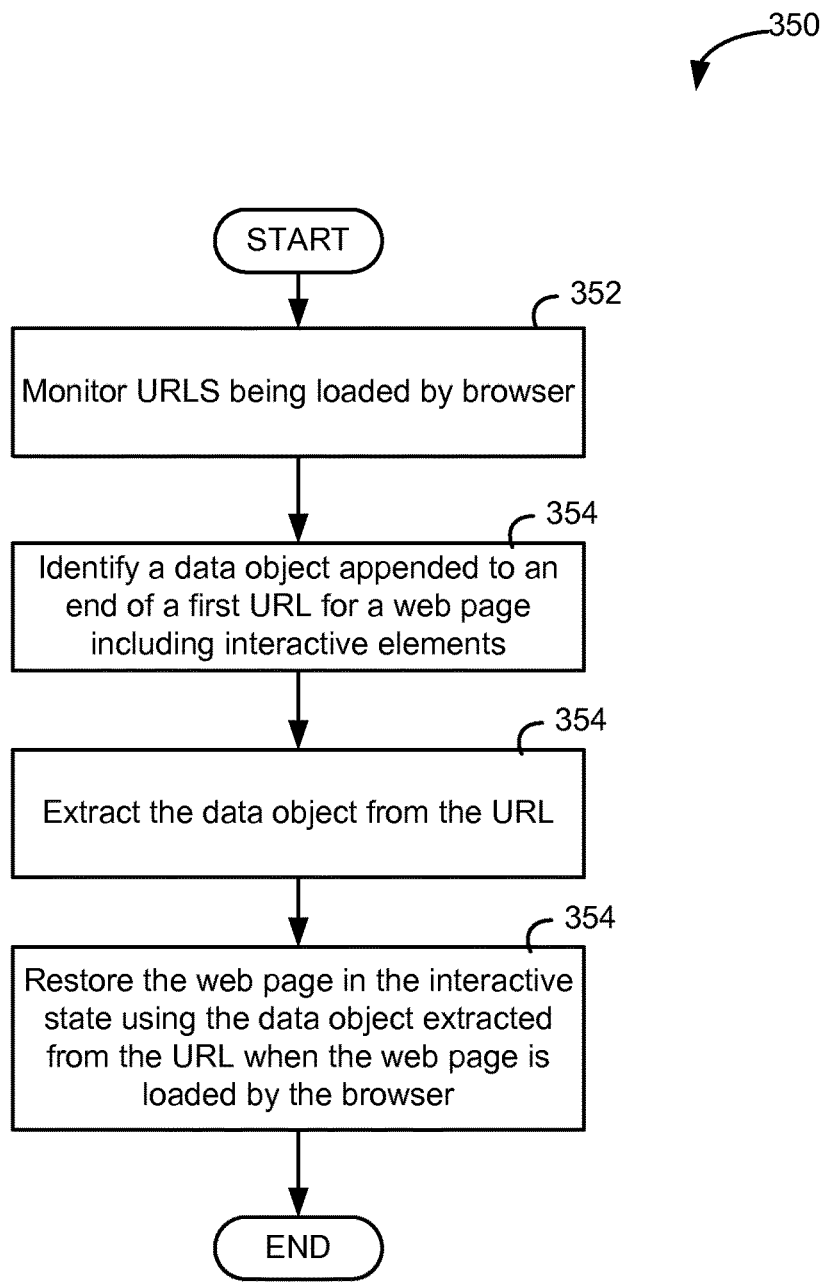
FIG. 3B is a flow diagram of another embodiment of a method of interactive restoring.

FIG. 3B is a flow diagram of another embodiment of a method 350 of interactive restoring. The method 350 is performed by processing logic that may comprise hardware (circuitry, dedicated logic, etc.), software (such as is run on a general-purpose computing system or a dedicated machine), or a combination of both. In one embodiment, the interactive state restoring tool 120 of FIG. 1 performs the method 350. In another embodiment, the interactive state restoring tool 200 of FIG. 2 performs the method 350. Alternatively, other components of the client computing system 102 or resource machine 104 can be configured to perform some or all of the method 350.

Referring to FIG. 3A, method 350 begins by the processing logic with monitoring, URLs being loaded by the browser (block 352). The processing logic identifies a data object appended to an end of a first URL for a web page including interactive elements (block 354). As described herein, the web page is in a default state when loaded by the browser in a first instance and is in an interactive state when any one of the plurality of interactive elements is changed. The processing logic extracts the data object from the URL (block 356). The processing logic restores the web page in the interactive state using the data object extracted from the URL when the web page is loaded by the browser (block 358), and the method 350 ends.

In a further embodiment, the processing logic loads the web page in the default state when the first URL does not include the data object and loads the web page in the interactive state when the first URL includes the data object, wherein the data object specifies one or more parameters of the plurality of interactive elements representing the interactive state of the plurality of interactive elements. In a further embodiment, the interactive elements include a filter and the processing logic applies a parameter of the filter to the web page when being loaded by the browser.

In a further embodiment, the first URL is loaded by the browser as a static page-to-page link. In another embodiment, the first URL is loaded by the browser in response to the first URL being activated in a message, such as an email message or an instant message.

In a further embodiment, the first URL is loaded by the browser in a navigation history of the browser. In a further embodiment, the processing logic loads the web page using a default URL representing when the web page is in the default state in the first instance. The processing logic intercepts a command to indicate that a user is leaving the web page. In response to the command, the processing logic captures the interactive state of the web page, creates the data object including attribute-value pairs to represent the interactive state. In a further embodiment, the processing logic determines whether a size of the data object precludes the data object from being appended to the URL in view of a character limit of URLs. When the size of the data object precludes the data object from being appended, the processing logic consolidates the data object to a consolidated format, appends the data object to the URL to create a modified URL corresponding to the web page in the interactive state, and adds the navigation history of the browser. The modified URL is the first URL loaded by the browser.

In another embodiment, the processing logic can perform the other operations as described above with respect to FIG. 3A.

Figure 4:
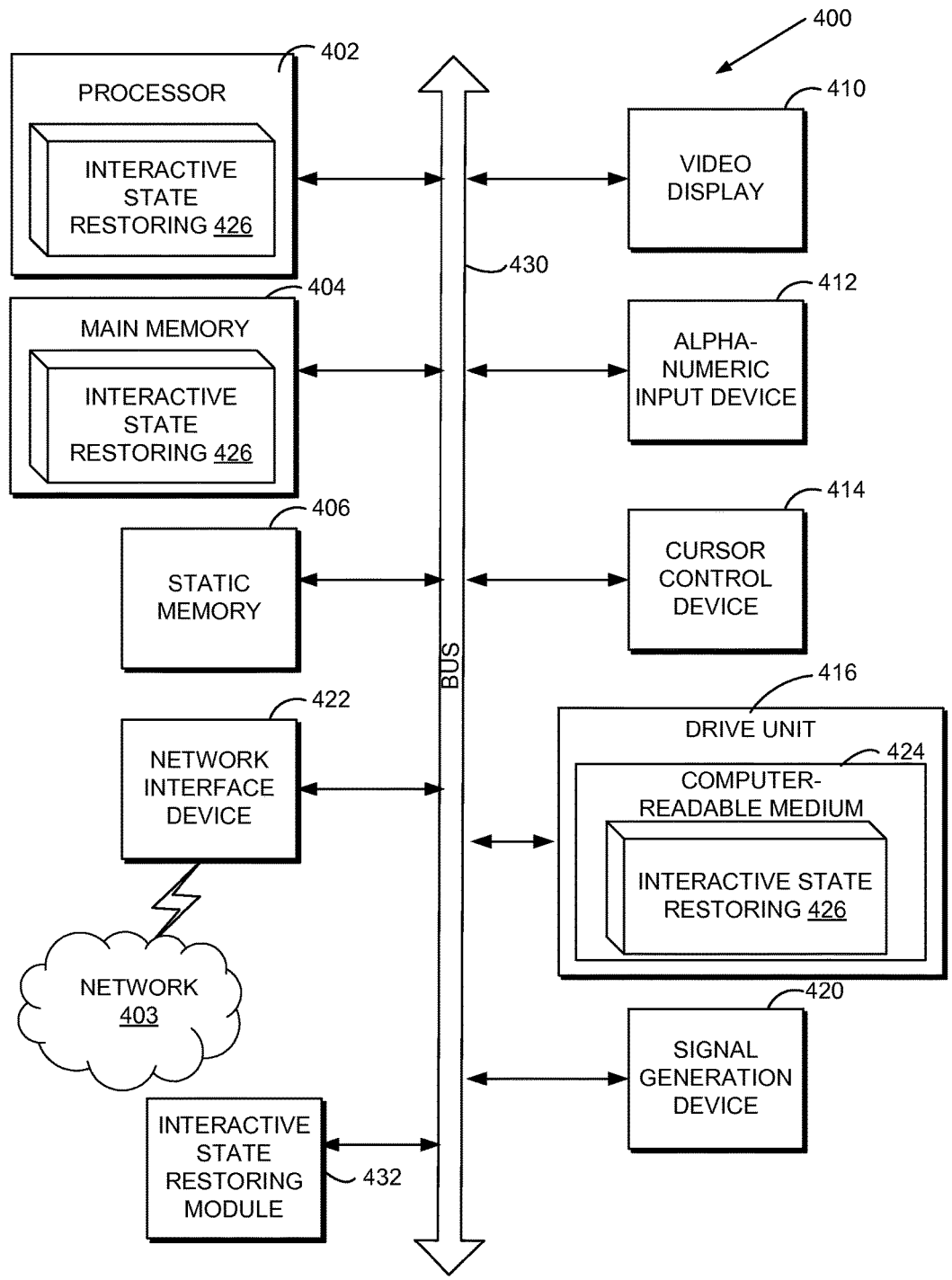
FIG. 4 illustrates a diagrammatic representation of a machine in the exemplary form of a computing system within which a set of instructions, for causing the machine to perform any one or more of the methodologies described herein, may be executed.

FIG. 4 illustrates a diagrammatic representation of a machine in the exemplary form of a computing system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as method 300 of FIG. 3A or method 350 of FIG. 3B.

The exemplary computing system 400 includes a processor 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 418, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic for interactive state restoring 426 for performing the operations and steps discussed herein.

The computing system 400 may further include a network interface device 422. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions (e.g., interactive state restoring 426) embodying any one or more of the methodologies or functions described herein. The interactive state restoring 426 may also reside, completely or at least partially, within the main memory 404 and/or within the processor 402 during execution thereof by the computing system 400, the main memory 404 and the processor 402 also constituting computer-readable media. The interactive state restoring 426 may further be transmitted or received over a network 403 via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The interactive state restoring module 432, components, and other features described herein (for example in relation to FIGS. 1 and 2) can be implemented as discrete hardware components or integrated in the functionality of hardware components such as ASICS, FPGAs, DSPs, or similar devices. The interactive state restoring module 432 may implement operations of interactive state restoring as described herein with respect to FIGS. 1-4. In addition, the interactive state restoring module 432 can be implemented as firmware or functional circuitry within hardware devices. Further, the interactive state restoring module 432 can be implemented in any combination hardware devices and software components.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring," "identifying," "storing," "providing," "selecting," "obtaining," "receiving," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
monitoring, by an interactive state restoring tool executing in connection with a browser executing by a processor, uniform resource locators (URLs) being loaded by the browser;

identifying, by the interactive state restoring tool, a data object appended to an end of a first URL for a web page comprising a plurality of interactive elements, wherein the web page is in a default state when loaded by the browser in a first instance and the web page is in an interactive state when any one of the plurality of interactive elements is changed;

extracting, by the interactive state restoring tool, the data object from the URL, wherein the data object comprises data values of the plurality of interactive elements that have changed from the default state; and restoring, by the interactive state restoring tool, the web page in the interactive state using the data object extracted from the URL when the web page is loaded by the browser.

2. The method of claim 1, further comprising:

loading the web page in the default state when the first URL does not include the data object; and loading the web page in the interactive state when the first URL includes the data object, wherein the data object specifies one or more parameters of the plurality of interactive elements representing the interactive state of the plurality of interactive elements.

3. The method of claim 1, wherein the plurality of interactive elements comprises a filter, and wherein the method further comprising applying a parameter of the filter to the web page when being loaded by the browser.

4. The method of claim 1, wherein the first URL is loaded by the browser as at least one of a static page-to-page link or an email link in a message.

5. The method of claim 1, wherein the first URL is loaded by the browser in a navigation history of the browser, wherein the method further comprises:

loading the web page, by the browser, using a default URL representing when the web page is in the default state in the first instance;

intercepting, by the interactive state restoring tool, a command to indicate that a user is leaving the web page;

in response to the command, capturing, by the interactive state restoring tool, the interactive state of the web page, creating, by the interactive state restoring tool, the data object comprising attribute-value pairs to represent the interactive state, determining whether a size of the data object precludes the data object from being appended to the URL in view of a character limit of URLs, when the size of the data object precludes the data object from being appended, consolidating the data object to a consolidated format, appending the data object to the URL to create a modified URL corresponding to the web page in the interactive state, and adding the modified URL to the navigation history of the browser, wherein the modified URL is the first URL loaded by the browser.

6. The method of claim 5, wherein the interactive state restoring tool is implemented in JavaScript.

7. The method of claim 6, wherein the capturing the interactive state comprises:

inspecting a current state of each of the plurality of interactive elements;

recording data values representing the current state of any one or more of the plurality of interactive elements that have changed from the default state; and creating a JavaScript Objection Notation (JSON) object as the data object with the recorded current states, and wherein the consolidating comprises identifying the data values in common and combining the data values in common in the consolidated format when the size of the data object precludes the data object from being appended.

8. The method of claim 6, wherein the capturing the interactive state comprises:

inspecting a current state of each of the plurality of interactive elements;

identifying one or more of the plurality of interactive elements whose current state has changed, and wherein the consolidating comprises:

identifying two or more of the plurality of interactive elements that have common attributes or common values for consolidation; and consolidating the current states of the two or more of the plurality of interactive elements into a consolidated state; and creating a JavaScript Objection Notation (JSON) object as the data object with at least data values representing the consolidated state, and wherein the appending the data object to the URL comprises:

creating a string with the data values representing the consolidated state from the JSON object; and adding the string to an end of the URL to create the modified URL.

9. The method of claim 6, wherein a first interactive element of the plurality of interactive elements is a filter with parameters specified by a user, wherein the capturing the interactive state further comprises:

inspecting the filter to identify the parameters to capture the current state of the filter;

recording data values representing the identified parameters as the current state; and creating JavaScript Objection Notation (JSON) object as the data object with at least the data values representing the identified parameters of the filter.

10. The method of claim 6, wherein the capturing the interactive state further comprises:

inspecting a current state of each of the plurality of interactive elements;

recording data values representing the current state of any one or more of the plurality of interactive elements that have changed from the default state, wherein the consolidating comprises:

determining common data points in current states of two or more of the plurality of interactive elements; and creating an array to represent the of current states of the two or more of the plurality of interactive elements to consolidate the current states; and creating JavaScript Objection Notation (JSON) object as the data object with at least the array, and wherein the appending comprises:

creating a string with data values representing the current states from the JSON object; and adding the string to an end of the URL.

11. The method of claim 1, wherein common data values of the data object are consolidated when a size of the data object exceeds a threshold.

12. A non-transitory computer readable storage medium including instructions that, when executed by a processor, cause the processor to perform operations comprising:

monitoring, by an interactive state restoring tool executing in connection with a browser executing by a processor, uniform resource locators (URLs) being loaded by the browser;

identifying, by the interactive state restoring tool, a data object appended to an end of a first URL for a web page comprising a plurality of interactive elements, wherein the web page is in a default state when loaded by the browser in a first instance and the web page is in an interactive state when any one of the plurality of interactive elements is changed;

extracting, by the interactive state restoring tool, the data object from the URL, wherein the data object comprises data values of the plurality of interactive elements that have changed from the default state; and restoring, by the interactive state restoring tool, the web page in the interactive state using the data object extracted from the URL when the web page is loaded by the browser.

13. The non-transitory storage medium of claim 12, further comprising:

loading the web page in the default state when the first URL does not include the data object; and loading the web page in the interactive state when the first URL includes the data object, wherein the data object specifies one or more parameters of the plurality of interactive elements representing the interactive state of the plurality of interactive elements.

14. The non-transitory storage medium of claim 12, wherein the plurality of interactive elements comprises a filter, and wherein the method further comprising applying a parameter of the filter to the web page when being loaded by the browser.

15. The non-transitory storage medium of claim 12, wherein the first URL is loaded by the browser as at least one of a static page-to-page link or an email link in a message.

16. The non-transitory storage medium of claim 12, wherein the first URL is loaded by the browser in a navigation history of the browser, wherein the method further comprises:

loading the web page, by the browser, using a default URL representing when the web page is in the default state in the first instance;

receiving, by the browser, input to change one or more of the plurality of interactive elements;

intercepting, by the interactive state restoring tool, a command to close the web page;

in response to the command,
capturing, by the interactive state restoring tool, the interactive state of the web page,
creating, by the interactive state restoring tool, a data object comprising attribute-value pairs to represent the interactive state,
determining whether a size of the data object precludes the data object from being appended to the URL in view of a character limit of URLs,
when the size of the data object precludes the data object from being appended, consolidating the data object to a consolidated format,
appending the data object to the URL to create a modified URL corresponding to the web page in the interactive state, and
adding the modified URL to a navigation history of the browser, wherein the modified URL is the first URL loaded by the browser.

17. The non-transitory storage medium of claim 16, wherein the interactive state restoring tool is implemented in JavaScript, and wherein the capturing the interactive state comprises:

inspecting a current state of each of the plurality of interactive elements;

recording data values representing the current state of any one or more of the plurality of interactive elements that have changed from the default state; and creating a JavaScript Objection Notation (JSON) object as the data object with the recorded current states, and wherein the consolidating comprises identifying the data values in common and combining the data values in common in the consolidated format when the size of the data object precludes the data object from being appended, and wherein the appending the data object to the URL comprises:

creating a string with the data values representing the consolidated state from the JSON object; and adding the string to an end of the URL to create the modified URL.

18. The non-transitory storage medium of claim 16, wherein the interactive state restoring tool is implemented in JavaScript, and wherein the capturing the interactive state comprises:

inspecting a current state of each of the plurality of interactive elements;

identifying one or more of the plurality of interactive elements whose current state has changed, and wherein the consolidating comprises:

identifying two or more of the plurality of interactive elements that have common attributes or common values for consolidation, and consolidating the current states of the two or more of the plurality of interactive elements into a consolidated state; and creating a JavaScript Objection Notation (JSON) object as the data object with at least data values representing the consolidated state, wherein the appending the data object to the URL comprises:

creating a string with the data values representing the consolidated state from the JSON object; and adding the string to an end of the URL to create the modified URL.

19. An apparatus comprising:
a memory device; and
a processor coupled to the memory device, wherein the processor is to execute an interactive state restoring tool in a browser, the interactive state restoring tool to:

monitor uniform resource locators (URLs) being loaded by the browser;

identify a data object appended to an end of a first URL for a web page comprising a plurality of interactive elements, wherein the web page is in a default state when loaded by the browser in a first instance and the web page is in an interactive state when any one of the plurality of interactive elements is changed;

extract the data object from the URL, wherein the data object comprises data values of the plurality of interactive elements that have changed from the default state; and restore the web page in the interactive state using the data object extracted from the URL when the web page is loaded by the browser.

20. The apparatus of claim 19, wherein the first URL is loaded by the browser as at least one of a static page-to-page link or an email link in a message.

21. The apparatus of claim 19, wherein the first URL is loaded by the browser in a navigation history of the browser, wherein the interactive state restoring tool is further to:
    load the web page, by the browser, using a default URL representing when the web page is in the default state in the first instance;
    intercept, by the interactive state restoring tool, a command to close the web page;
    in response to the command,
        capture, by the interactive state restoring tool, the interactive state of the web page,
        create, by the interactive state restoring tool, the data object comprising attribute-value pairs to represent the interactive state,
        determine whether a size of the data object precludes the data object from being appended to the URL in view of a character limit of URLs,
        when the size of the data object precludes the data object from being appended, consolidate the data object to a consolidated format,
        append the data object to the URL to create a modified URL corresponding to the web page in the interactive state, and
        add the modified URL to the navigation history of the browser, wherein the modified URL is the first URL loaded by the browser.

\* \* \* \* \*